US011115454B2

(12) United States Patent
Chakra et al.

(10) Patent No.: US 11,115,454 B2
(45) Date of Patent: Sep. 7, 2021

(54) REAL-TIME FEEDBACK FOR ONLINE COLLABORATION COMMUNICATION QUALITY

(71) Applicant: International Business Machines Corporation, Armonk, NY (US)

(72) Inventors: Al Chakra, Apex, NC (US); Ahmad Abdul Wakeel, Lucan (IE); Kevin Carr, Raleigh, NC (US); Faisal Ghaffar, Dunboyne (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 37 days.

(21) Appl. No.: 16/572,974

(22) Filed: Sep. 17, 2019

(65) Prior Publication Data

US 2021/0084094 A1 Mar. 18, 2021

(51) Int. Cl.
*H04L 12/16* (2006.01)
*H04L 29/06* (2006.01)
*H04L 12/26* (2006.01)

(52) U.S. Cl.
CPC .............. *H04L 65/80* (2013.01); *H04L 43/50* (2013.01); *H04L 65/403* (2013.01)

(58) Field of Classification Search
None
See application file for complete search history.

(56) References Cited

U.S. PATENT DOCUMENTS

| | | | |
|---|---|---|---|
| 7,545,923 B1* | 6/2009 | Campion | H04M 3/56 379/1.01 |
| 8,467,321 B1* | 6/2013 | Groenjes | H04L 12/1827 370/260 |
| 9,325,838 B2* | 4/2016 | Assem | H04L 47/196 |
| 10,244,104 B1* | 3/2019 | Ireland | G10L 15/26 |
| 10,284,452 B2* | 5/2019 | Kosbab | H04W 4/14 |
| 10,616,304 B2* | 4/2020 | Lee | H04L 65/604 |
| 2009/0135741 A1 | 5/2009 | Mykhalchuk et al. | |
| 2011/0255397 A1 | 10/2011 | Kadakia et al. | |

(Continued)

FOREIGN PATENT DOCUMENTS

WO 2015105408 A1 7/2015

*Primary Examiner* — Sithu Ko
(74) *Attorney, Agent, or Firm* — Cantor Colburn LLP; Teddi Maranzano (57) ABSTRACT

Aspects of the invention include systems and methods for real-time feedback for online collaboration communication quality. A non-limiting example computer-implemented method includes monitoring a conference between a plurality of participants, wherein each participant accesses the conference via a respective Voice over Internet Protocol (VoIP) device. The method further includes detecting, by a processor, an indication, by a scoring system that monitors the conference, of a degradation of sound quality of at least one VoIP device being used to access the conference. The processor engages in verifying the indication of the degradation by analyzing a peer-to-peer test between the VoIP device that has an indication of a degradation of sound quality and a VoIP device that does not have an indication of a degradation of sound quality. The process engages in determining a corrective measure based on the indication of the degradation of sound quality and the peer-to-peer test

20 Claims, 5 Drawing Sheets

(56) References Cited

U.S. PATENT DOCUMENTS

| | | | |
|---|---|---|---|
| 2012/0300646 A1* | 11/2012 | Sloyer | H04L 65/80 |
| | | | 370/252 |
| 2012/0300769 A1* | 11/2012 | Narbutt | H04L 65/80 |
| | | | 370/352 |
| 2013/0279678 A1 | 10/2013 | Beerse et al. | |
| 2015/0142702 A1 | 5/2015 | Nilsson et al. | |
| 2015/0156324 A1* | 6/2015 | Assem | H04M 3/56 |
| | | | 370/260 |
| 2015/0179186 A1* | 6/2015 | Swierk | G06F 3/165 |
| | | | 704/276 |
| 2016/0337510 A1* | 11/2016 | Li | H04M 3/2227 |
| 2018/0034581 A1* | 2/2018 | Gupta | H04L 67/10 |
| 2019/0164563 A1* | 5/2019 | Volcker | H04L 12/1827 |

* cited by examiner

REAL-TIME FEEDBACK FOR ONLINE COLLABORATION COMMUNICATION QUALITY

BACKGROUND

The present invention generally relates to a communication network, and more specifically, relates to real-time feedback for online collaboration communication quality.

Voice over Internet Protocol (VoIP) is a methodology and group of technologies for the delivery of voice communications and multimedia sessions over Internet Protocol (IP) networks, such as the internet. VoIP packet loss occurs when a large amount of traffic on an IP network causes dropped packets. When VoIP packet loss occurs during a VoIP call, the packet loss can result in poor call quality, (i.e., dropped conversations, a delay in receiving the voice communication, or extraneous noise on the call).

SUMMARY

Embodiments of the present invention are directed to real-time feedback for online collaboration communication quality. A non-limiting example computer-implemented method includes monitoring a conference between a plurality of participants, wherein each participant accesses the conference via a respective Voice over Internet Protocol (VoIP) device. The method further includes detecting, by a processor, an indication, by a scoring system that monitors the conference, of a degradation of sound quality of at least one VoIP device being used to access the conference. The processor engages in verifying the indication of the degradation by analyzing a peer-to-peer test between the VoIP device that has an indication of a degradation of sound quality and a VoIP device that does not have an indication of a degradation of sound quality. The process engages in determining a corrective measure based on the indication of the degradation of sound quality and the peer-to-peer test.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and does not imply a direct connection between the elements with no intervening elements/connections between them. All of these variations are considered a part of the specification.

DETAILED DESCRIPTION

One or more embodiments of the present invention provide a voice over internet protocol (VoIP) conferencing system that displays real-time sound quality feedback for each participant in a conference. The system further takes or suggests a corrective action to allow the conference to continue seamlessly.

VoIP communications allow for voice communications and multimedia sessions over Internet Protocol (IP) networks. However, sound degradation due to packet loss can cause a variety of sound degradation issues during VoIP voice communications, including for example, dropped calls, broken audio, clicking, or even silence. During remote conferencing, it is not uncommon for one or more participants to experience sound quality issues. These issues often slow down a conference due to, for example, repeatedly having to ask someone to repeat themselves. In other instances, a participant may be listening and not realize that their device's performance has degraded.

Conventional conferencing systems do not provide real-time analysis of the sound quality from a particular device. In many instances, participants are left wondering, "Is that your phone or my phone?" Furthermore, conventional conferencing systems have no real-time suggestions or solutions to improve the sound quality. This typically leads to one or more parties disconnecting and reconnecting their devices to rejoin a conference.

One or more embodiments of the present invention address one or more of the above-described shortcomings of the prior art by providing methods and systems for a VoIP-based conferencing system that displays a real-time mean opinion score (MOS) of each participating device. The MOS is a score based on the sound quality produced by each VoIP device. In this sense, each participant has a real-time assessment of each device being used to participate in the conference. Furthermore, the methods and systems include recommendations to address sound quality issues to minimize time spent on determining a solution.

Figure 1:
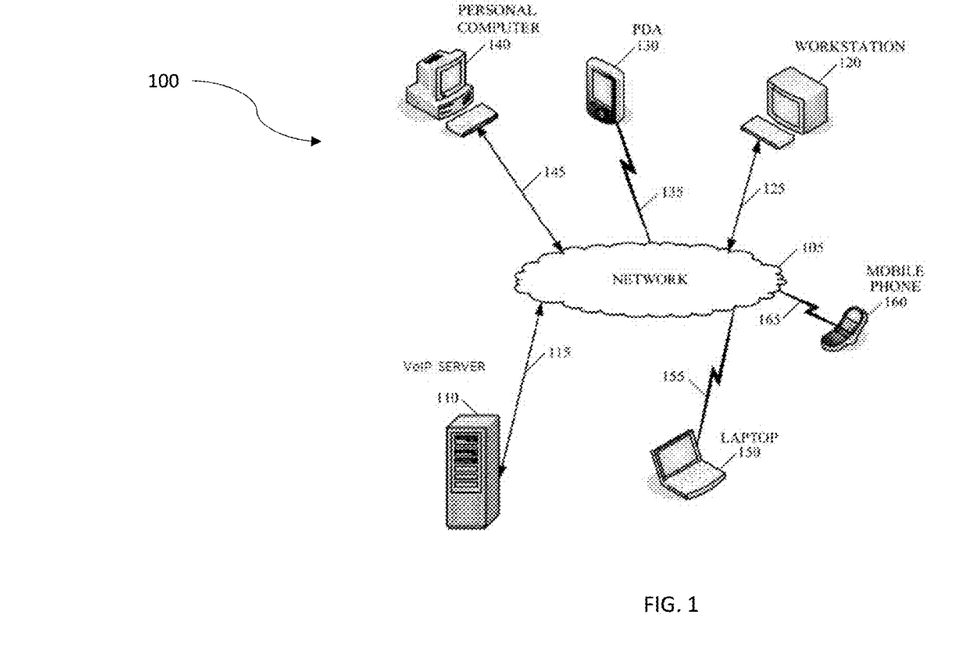
FIG. 1 illustrates a block diagram of components of a Voice over Internet Protocol (VoIP) system, in accordance with one or more embodiments of the present invention.

With reference now to the figures, FIG. 1 depicts a pictorial representation of an exemplary Voice over Internet Protocol (VoIP) system 100 in which aspects of the illustrative embodiments of the present invention may be implemented. The VoIP system 100 can include a network 105, VoIP server 110 connected to network 105 through wireline connection 115 and VoIP devices. Examples of VoIP devices shown in FIG. 1 include a workstation 120 coupled to network 105 through wireline connection 125, a personal digital assistant (PDA) 130 coupled to network 105 through wireless connection 135, a personal computer 140 coupled to network 105 through wireline connection 145, a laptop computer 150 coupled to network 105 through wireless connection 155, and a mobile phone 160 coupled to network 105 through wireless connection 165.

The network 105 may include the Internet or another wide area network (WAN), a local area network (LAN), or a combination of networks, and may provide data communications among the VoIP server 110 and the VoIP devices 120, 130, 140, 150, and 160. VoIP server 110 may have software to facilitate communications and monitor and address packet loss in communications (VoIP calls) across network 105. VoIP server 110 may receive requests to make VoIP calls. For example, VoIP server 110 may receive digital data representing a telephone number. VoIP server 110 may determine that the request to make a VoIP call is in the proper format and may determine an IP address for a recipient or recipients. VoIP server 110 may establish a virtual connection between the VoIP device placing the VoIP call and a destination VoIP device, thereby establishing a VoIP call session. In other embodiments, VoIP call sessions may be transmitted between VoIP devices without a server such as VoIP server 110.

Users may participate in VoIP conversations using VoIP devices, such as devices 120, 130, 140, 150, and 160. In some embodiments, the VoIP devices such as devices 120, 130, 140, 150, and 160 may run client software. When a participant opens client software, the client may attempt to connect with VoIP server 110. If the connection is successful, the client may inform the VoIP server 110 of the participant's Internet Protocol (IP) address, a number identifying the VoIP device, and the number of a port assigned to the client. In other embodiments, a participant may visit a website using a VoIP device to participate in a VoIP call. In this case, no client software may reside on the participant's VoIP device.

Figure 2:
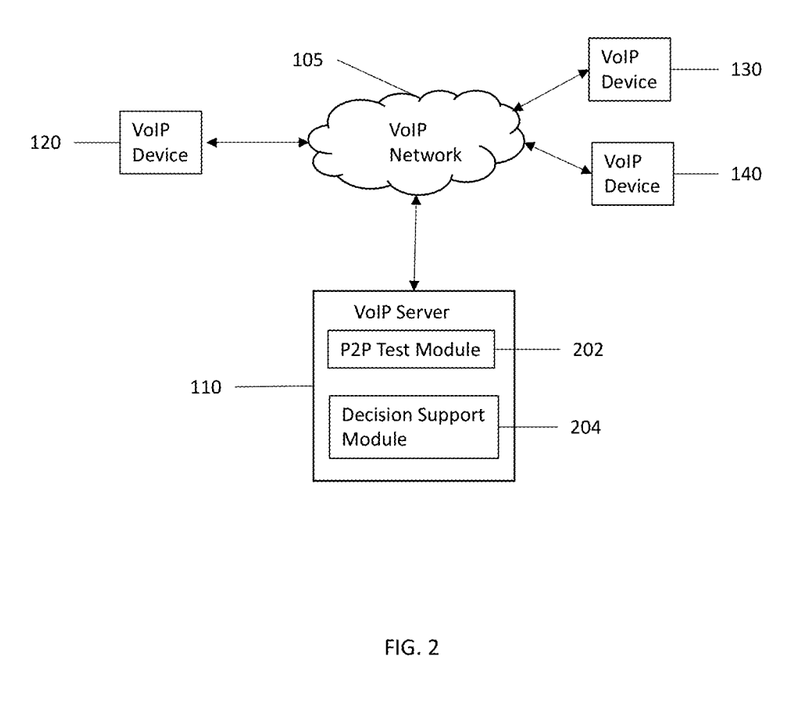
FIG. 2 illustrates a block diagram of components of a VoIP system in accordance with one or more embodiments of the present invention.

FIG. 2 is a diagram illustrating an interaction between VoIP devices 120, 130, 140 during a VoIP call according to one or more embodiments of the present invention. A VoIP device 120 can conduct a VoIP call directed to VoIP devices 130, 140 via the network 105 and the VoIP server 110. The VoIP server 110 includes a peer-to-peer test module 202 and a decision support module 204. The VOIP server 110 is operable to continuously generate mean operating scores (MOS) for each participant of a conference. The peer-to-peer test module 202 is operable for performing a quality test between a VoIP device functioning properly and a VoIP device with an indication of poor sound quality. The decision support module 204 is operable for initiating a corrective action, including making suggestions in response to confirmation by the peer-to-peer test module 202 of poor sound quality.

During a VoIP voice call between VoIP devices 120, 130, 140, call quality degradation from one or more of the VoIP devices can occur while callers are communicating. The MOS is a numerical measurement used to gauge the quality of communication between participants. To obtain an MOS score, the VoIP server 110 continuously gathers sound waveforms from each VoIP device 120, 130, 140 being used in the conference. The sound waveforms are, for example, the signal representations of the people talking during the conference. In addition to the sound of the participants talking, the sound waveforms include sounds emitted from a microphone of one VoIP device 120, 130, 140 of a user of a different VoIP device 120, 130, 140. In this sense, the VoIP server 110 has the data to continuously update the MOS of a VoIP device 120, 130, 140 even if the user of the respective device is not currently speaking.

Each gathered waveform is scored based on a set of algorithms that attempt to approximate the human experience based on, for example, clarity, delay, packet loss, and jitter. Modern MOS scoring algorithms also consider R factors, or factors that lead to degradation of sound quality that is not related to the communication network. These R factors include propagation delay, packetization delay, and jitter buffer. The VoIP server 110 further causes the current MOS scores of each participant to be displayed on each VoIP device 120, 130, 140. In some embodiments, the MOS of each participant is color-coded based on the score.

In the event that the MOS of one or more VoIP device 120, 130, 140 falls below a threshold score for a period of time, the VoIP server 110 verifies the accuracy of the MOS. The peer-to-peer test module 202 causes a VoIP device 120, 130, 140, whose MOP is above the threshold value and the VoIP device whose MOS has fallen below a threshold level to transmits test data packets to each other. The test data packets provide instructions for the receiving VoIP device 120, 130, 140 to, for example, calculate and provide a sum of the test data packets received within a predetermined period of time. The test data packets can be sent via one or more parallel transmission channels or through a single serial transmission channel. The peer-to-peer test module 202 can further monitor the data transfer rate, or any other test to appropriately analyze the sound quality of the VoIP device 120, 130, 140.

The peer-to-peer test module 202 is operable to choose which VoIP device 120, 130, 140 to use in order to perform the tests. For example, the peer-to-peer test module 202 stores the MOS of each respective VoIP device 120, 130, 140 from a current conference and previous conferences. Based on these historical records, the peer-to-peer test module 202 can choose not to use a VoIP device 120, 130, 140 whose MOS is currently above the threshold, but has shown instances of falling below the threshold in the past. The peer-to-peer test module 202 may also choose a VoIP device 120, 130, 140 with similar functionality as the VoIP device 120, 130, 140 whose MOS is below the threshold value to initiate the peer-to-peer testing. For example, if a VoIP device 120, 130, 140 whose MOS is below the threshold value is a mobile computing device with audio and video feed, the peer-to-peer test module 202 can choose another mobile device over a personal computer to initiate the peer-to-peer testing.

Based on the MOS and analysis of the peer-to-peer test module 202, the VoIP server 110 determines an appropriate corrective measure. The corrective measure can be actual steps to alter the transmission capabilities of a VoIP device 120, 130, 140, or to provide suggestions to the participants. The corrective measures include removing or recommending removal of the video feed functionality of a participant whose VoIP device 120, 130, 140 has a MOS below the threshold value. Another option would be to alter an audio feed to provide speech-to-text that displays the text on the other participant's VoIP devices 120, 130, 140. If on the other hand, the peer-to-peer testing does not confirm the MOS, no corrective measures need to be taken.

The VoIP server 110 bases the corrective action in part on the importance/employment position/job title and level of participation of the participants of the conference. The VoIP server 110 is engaged with each of the VoIP devices 120, 130, 140 through the network 105 and operable to read data stored on the devices. Therefore, by reviewing emails, employee directories, documents stored on the VoIP devices 120, 130, 140, the VoIP server 110 determines whether, for example, a participant is a chief executive office or a new hire. If the participant whose VoIP device 120, 130, 140 has a MOS below the threshold value is a CEO, the VoIP server 110 can choose to suggest rescheduling the conference rather than removing a video feed from the CEO's VoIP device 120, 130, 140. The VoIP server 110 also bases its decision in part on a level of participation, for example, time speaking, presentation of exhibits, etc. For example, if the participant whose VoIP device 120, 130, 140 has a MOS below the threshold, has spoken the most during a conference, but another participant has presented video of images through their device, the VoIP server 110 may choose to recommend rescheduling the conference or removing the speaking participant's video feed to improve their MOS.

The VoIP server 110 can also monitor a user's activities through the network 105. If for example, a participant whose VoIP device 120, 130, 140 has a MOS below the threshold is scrolling through the internet at unrelated sites, the VoIP server 110 may choose to or recommend that participant's VoIP device 120, 130, 140 be disconnected from the conference or switched to audio only to improve the MOS score. If on the other hand, a participant whose VoIP device 120, 130, 140 has a MOS below the threshold is searching the internet for words and phrases related to words, phrases or concepts discussed in the conference, the VoIP server 110 may choose to recommend rescheduling the conference. The VoIP server 110 uses natural language processing (NLP) techniques in part to determine a relationship between websites visited, search terms and words and phrases uttered during the conference. Based on a confidence level of the relationship between the websites visited, search terms and words and phrases uttered during the conference, the VoIP server 110 takes or recommends corrective action.

The VoIP server 110 is equipped with artificial intelligence circuitry to employ one or more artificial intelligence models to assist with the decision-making process. The artificial intelligence models include, but are not limited to decision trees, decision tables, support vector machines, clustering models, hidden Markov models, and Gaussian mixture models. An artificial intelligence model is trained using a training set compiled of previous conferences and decisions as well as continuously receiving data form conferences. The artificial intelligence models assist the VoIP server 110 to make decisions based on the participants, the MOS scores, and the topics of conversation. For example, an artificial intelligence model learns that a particular c-level executive prefers to reschedule meetings if a particular participant has a VoIP device 120, 130, 140 that a MOS below the threshold. In another example, the artificial intelligence model determines that a particular company, regardless of individual participants, prefers to carry on a meeting regardless of sound quality. In this instance, VoIP server 110 may choose to or recommend the participants remove some functionality to improve the MOS.

Figure 3:
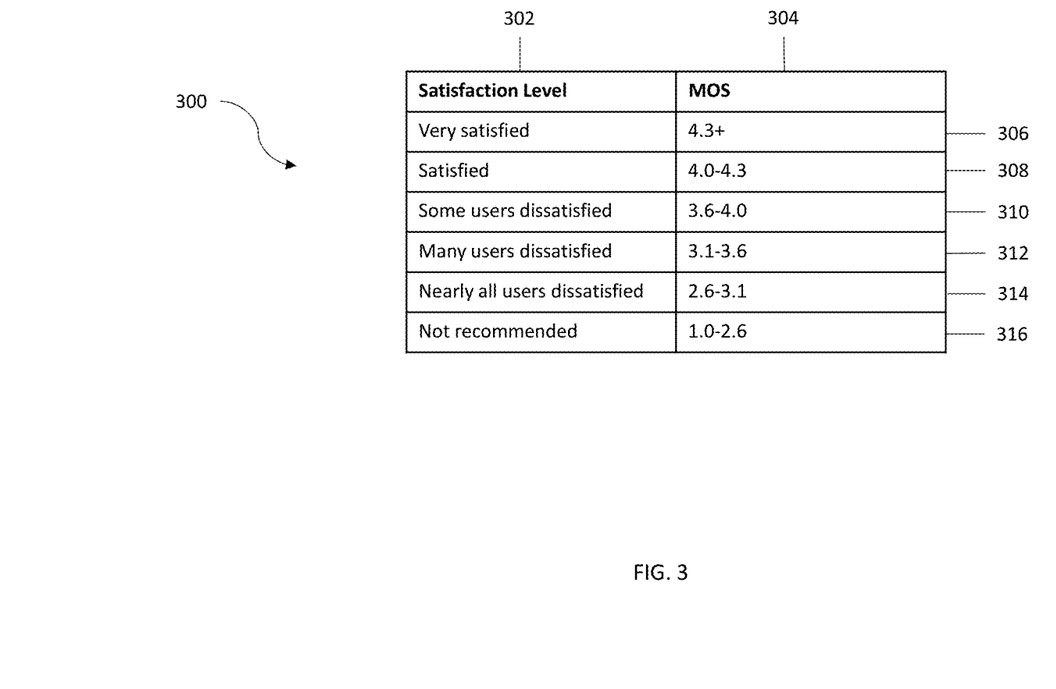
FIG. 3 illustrates an exemplary mean opinion score (MOS) scoring system in accordance with one or more embodiments of the present invention.

Turning to FIG. 3, an example of a scoring system 300 for the MOS is shown. The scoring system 300 is displaying in table form and includes a column for satisfaction level 302 and a column for the MOS 304. The table indicates a score value associated with an approximated level of satisfaction of a human with the sound quality of the conversation. The top row 306 indicates that a score of above 4.3 indicates that the users are very satisfied with the sound quality of the conversation. The next highest row 308 indicates that a score between 4.0 and 4.3 indicates that the users are satisfied with the sound quality of the conversation. The next highest row 310 indicates that a score of between 3.6 and 4.0 indicates that some users are dissatisfied with the sound quality of the conversation. The next highest row 312 indicates that a score of between 3.1 and 3.6 indicates that many users are dissatisfied with the sound quality of the conversation. The next highest row 314 indicates that a score of between 2.6 and 3.1 indicates that nearly all users are dissatisfied with the sound quality of the conversation. The lowest row 316 indicates that a score of between 1.0 and 2.6 indicates that the sound quality of the conversation is not recommended. It should be appreciated that although FIG. 3 illustrates an exemplary scoring system for MOS, different scoring systems for MOS can be used in conjunction with embodiments of the present invention.

Figure 4:
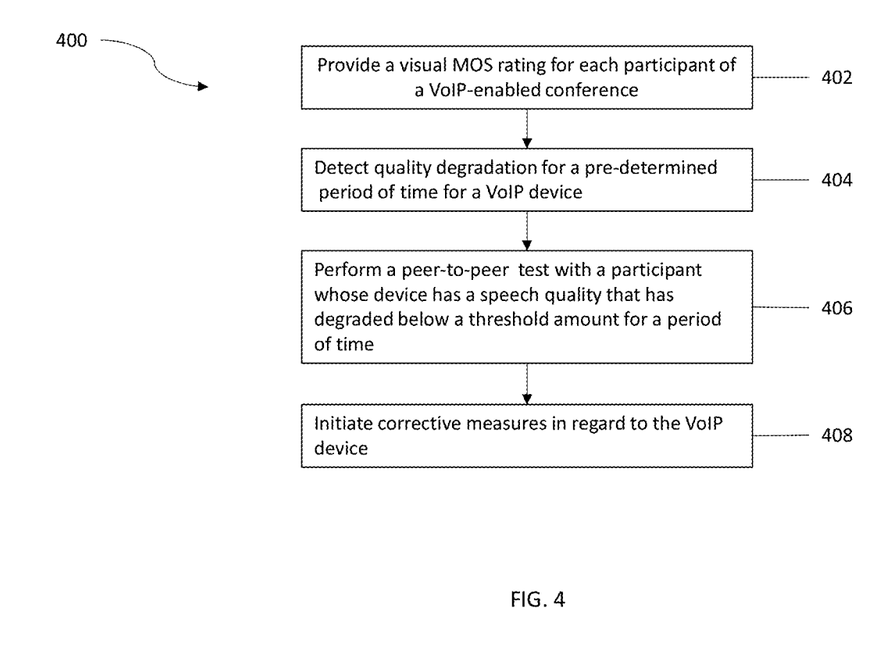
FIG. 4 illustrates a flow diagram of a process for real-time sound quality feedback during a conference in accordance with one or more embodiments of the present invention.

Referring to FIG. 4, a flow diagram of a process 400 for VoIP-based conferencing, in accordance with one or more embodiments of the present invention is shown. At block 402, each participant of a conference is provided visual, real-time MOS rating of each participant. The MOS is displayed on a VoIP device of each participant. At block 404, a MOS that falls below a threshold value for a predetermined period of time is detected. To verify that sound quality has degraded and the MOS is accurate, the VoIP server initiates peer-to-peer testing at block 406. The test is performed between two VoIP devices, in which one VoIP device has an indication of poor sound quality, and the other VoIP does not have an indication of poor sound quality. Based on the MOS and the results of the peer-to-peer testing, the VoIP server determines the appropriate corrective measures at block 408.

Figure 5:
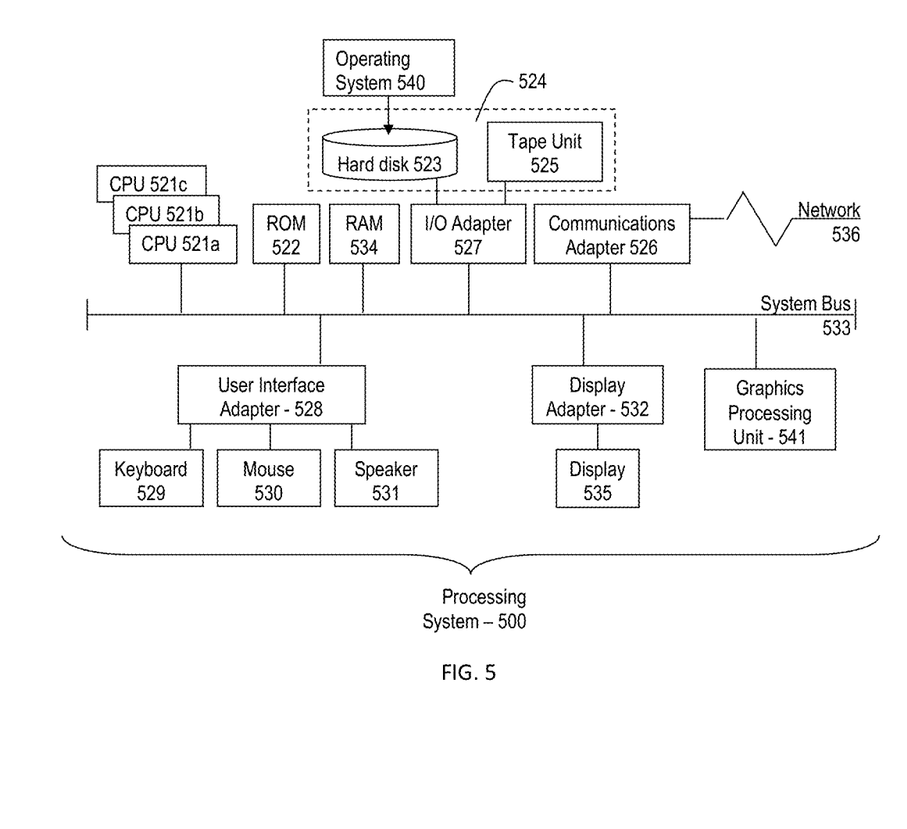
FIG. 5 illustrates an exemplary processing system in accordance with one or more embodiments of the present invention.

Referring to FIG. 5, there is shown an embodiment of a processing system 500 for implementing the teachings herein. In this embodiment, the system 500 has one or more central processing units (processors) 521a, 521b, 521c, etc. (collectively or generically referred to as processor(s) 521). In one or more embodiments, each processor 521 may include a reduced instruction set computer (RISC) microprocessor. Processors 521 are coupled to system memory 534 and various other components via a system bus 533. Read only memory (ROM) 522 is coupled to the system bus 533 and may include a basic input/output system (BIOS), which controls certain basic functions of system 500.

FIG. 5 further depicts an input/output (I/O) adapter 527 and a network adapter 526 coupled to the system bus 533. I/O adapter 527 may be a small computer system interface (SCSI) adapter that communicates with a hard disk 523 and/or tape storage drive 525 or any other similar component. I/O adapter 527, hard disk 523, and tape storage device 525 are collectively referred to herein as mass storage 524. Operating system 540 for execution on the processing system 500 may be stored in mass storage 524. A network adapter 526 interconnects bus 533 with an outside network 536 enabling data processing system 500 to communicate with other such systems. A screen (e.g., a display monitor) 535 is connected to system bus 533 by display adaptor 532, which may include a graphics adapter to improve the performance of graphics intensive applications and a video controller. In one embodiment, adapters 527, 526, and 532 may be connected to one or more I/O busses that are connected to system bus 633 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 533 via user interface adapter 528 and display adapter 532. A keyboard 529, mouse 530, and speaker 531 all interconnected to bus 533 via user interface adapter 528, which may include, for example, a Super I/O chip integrating multiple device adapters into a single integrated circuit.

In exemplary embodiments, the processing system 500 includes a graphics processing unit 541. Graphics processing unit 541 is a specialized electronic circuit designed to manipulate and alter memory to accelerate the creation of images in a frame buffer intended for output to a display. In general, graphics processing unit 541 is very efficient at manipulating computer graphics and image processing and has a highly parallel structure that makes it more effective than general-purpose CPUs for algorithms where processing of large blocks of data is done in parallel.

Thus, as configured in FIG. 5, the system 500 includes processing capability in the form of processors 521, storage capability including system memory 534 and mass storage 524, input means such as keyboard 529 and mouse 530, and output capability including speaker 531 and display 535. In one embodiment, a portion of system memory 534 and mass storage 524 collectively store an operating system coordinate the functions of the various components shown in FIG. 5.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an internet service provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
monitoring, by a processor, a conference between a plurality of participants, wherein each participant accesses the conference via a respective Voice over Internet Protocol (VoIP) device;
detecting an indication, by a scoring system that monitors the conference, of a degradation of sound quality of at least one VoIP device being used to access the conference;
selecting a second VoIP device that does not have an indication of a degradation of sound quality to perform a peer-to-peer test on based at least in part on a historical degradation performance of the second VoIP device;
verifying the indication of the degradation of sound quality by analyzing the peer-to-peer test between the VoIP device that has the indication of the degradation of sound quality and the selected VoIP device that does not have an indication of a degradation of sound quality; and
determining a corrective measure based on the indication of the degradation of sound quality and the peer-to-peer test.

2. The computer-implemented method of claim 1, wherein the scoring system is based on a mean opinion score.

3. The computer-implemented method of claim 2, wherein the indication of the degradation of sound quality is based on the mean opinion score being below a threshold value for a predetermined period of time.

4. The computer-implemented method of claim 1, wherein the peer-to-peer test comprises an analysis of test data packets transmitted between the VoIP device that has an indication of a degradation of sound quality and the VoIP device that does not have an indication of a degradation of sound quality.

5. The computer-implemented method of claim 1, wherein the mean opinion score of each respective participant is displayed on each VoIP device.

6. The computer-implemented method of claim 1, wherein the corrective measure is based at least in part on a respective importance of the participants of the conference.

7. The computer-implemented method of claim 1, wherein the corrective measure is based at least in part on a respective level of participation of the participants of the conference.

8. A system comprising:
a memory having computer readable instructions; and
one or more processors for executing the computer readable instructions, the computer readable instructions controlling the one or more processors to perform operations comprising:
monitoring, by a processor, a conference between a plurality of participants, wherein each participant accesses the conference via a respective Voice over Internet Protocol (VoIP) device;
detecting an indication by a scoring system of a degradation of sound quality of at least one VoIP device being used to access the conference;
selecting a second VoIP device that does not have an indication of a degradation of sound quality to perform a peer-to-peer test on based at least in part on a historical degradation performance of the second VoIP device;
verifying the indication of the degradation of sound quality by analyzing the peer-to-peer test between the VoIP device that has the indication of the degradation of sound quality and the selected VoIP device that does not have an indication of a degradation of sound quality; and
determining a corrective measure based on the indication of the degradation of sound quality and the peer-to-peer test.

9. The system of claim 8, wherein the scoring system is based on a mean opinion score.

10. The system of claim 8, wherein the indication of the degradation of sound quality is based on the mean opinion score being below a threshold value for a predetermined period of time.

11. The system of claim 8, wherein the peer-to-peer test comprises an analysis of test data packets transmitted between the VoIP device that has an indication of a degradation of sound quality and the VoIP device that does not have an indication of a degradation of sound quality.

12. The system of claim 8, wherein the mean opinion score of each respective participant is displayed on each VoIP device.

13. The system of claim 8, wherein the corrective measure is based in part on a respective importance of the participants of the conference.

14. The system of claim 8, wherein the corrective measure is based in part on a respective level of participation of the participants of the conference.

15. A computer program product comprising a computer readable storage medium having program instructions embodied therewith, the program instructions executable by a processor to cause the processor to perform operations comprising:
monitoring, by the processor, a conference between a plurality of participants, wherein each participant accesses the conference via a respective Voice over Internet Protocol (VoIP) device;
detecting an indication by a scoring system of a degradation of sound quality of at least one VoIP device being used to access the conference;
selecting a second VoIP device that does not have an indication of a degradation of sound quality to perform a peer-to-peer test on based at least in part on a historical degradation performance of the second VoIP device;
verifying the indication of the degradation of sound quality by analyzing the peer-to-peer test between the VoIP device that has the indication of the degradation of sound quality and the selected VoIP device that does not have an indication of a degradation of sound quality; and
determining a corrective measure based on the indication of the degradation of sound quality and the peer-to-peer test.

16. The computer program product of claim 15, wherein the scoring system is based on a mean opinion score.

17. The computer program product of claim 15, wherein the indication of the degradation is based on the mean opinion score being below a threshold value for a predetermined period of time.

18. The computer program product of claim 15, wherein the peer-to-peer test comprises an analysis of test data packets transmitted between the VoIP device that has an indication of a degradation of sound quality and the VoIP device that does not have an indication of a degradation of sound quality.

19. The computer program product of claim 15, wherein the mean opinion score of each respective participant is displayed on each VoIP device.

20. The computer program product of claim 15, wherein the corrective measure is based in part on a respective importance of the participants of the conference.

\* \* \* \* \*